US012120522B2

United States Patent
Ståhl et al.

(10) Patent No.: US 12,120,522 B2
(45) Date of Patent: Oct. 15, 2024

(54) PROVISION OF APPLICATION LEVEL IDENTITY

(71) Applicant: Telefonaktiebolaget LM Ericsson (publ), Stockholm (SE)

(72) Inventors: Per Ståhl, Klagshamn (SE); Bernard Smeets, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 380 days.

(21) Appl. No.: 17/617,414

(22) PCT Filed: Jun. 12, 2019

(86) PCT No.: PCT/EP2019/065350
§ 371 (c)(1),
(2) Date: Dec. 8, 2021

(87) PCT Pub. No.: WO2020/249206
PCT Pub. Date: Dec. 17, 2020

(65) Prior Publication Data
US 2022/0256349 A1 Aug. 11, 2022

(51) Int. Cl.
*H04W 12/30* (2021.01)
*H04W 12/069* (2021.01)
*H04W 12/72* (2021.01)

(52) U.S. Cl.
CPC ......... *H04W 12/35* (2021.01); *H04W 12/069* (2021.01); *H04W 12/72* (2021.01)

(58) Field of Classification Search
CPC .............................. H04W 12/35; H04W 12/72
See application file for complete search history.

(56) References Cited

U.S. PATENT DOCUMENTS

| 5,371,794 A * | 12/1994 | Diffie ................... H04L 9/0844 713/156 |
| 7,908,484 B2 * | 3/2011 | Haukka ............. H04W 12/0433 713/181 |
| 2003/0051041 A1 * | 3/2003 | Kalavade ............ H04W 12/084 709/229 |
| 2003/0069852 A1 * | 4/2003 | Martin .................. H04M 15/48 705/52 |

(Continued)

FOREIGN PATENT DOCUMENTS

EP 2461613 A1 6/2012

OTHER PUBLICATIONS

Bruni A. et al., "Formal Verification of Ephemeral Diffie-Hellman Over COSE (EDHOC)", International Conference on Research in Security Standardisation, Nov. 21, 2018, pp. 21-36.

(Continued)

*Primary Examiner* — William S Powers
(74) *Attorney, Agent, or Firm* — Sage Patent Group

(57) ABSTRACT

There is provided mechanisms for provisioning of an application level identity from an ID backend server to a communication device. The provisioning of the application level identity is protected using TLS-, DTLS-, or OSCORE-based secure communication. The communication device comprises an identity module configured for interaction according to GSMA RSP based remote subscription profile download. The methods are performed by the communication device and the ID backend server.

19 Claims, 10 Drawing Sheets

(56) References Cited

U.S. PATENT DOCUMENTS

| | | | |
|---|---|---|---|
| 2005/0025091 A1* | 2/2005 | Patel | H04L 9/083 370/328 |
| 2016/0301529 A1* | 10/2016 | Park | H04W 8/205 |
| 2019/0007216 A1* | 1/2019 | Meriac | G06F 21/572 |

OTHER PUBLICATIONS

Nokia, "Network access for remote credential provisioning of a UE—security considerations", 3GPP TSG SA WG3 (Security) Meeting SA3-NextGen, Sep. 27-29, 2016, pp. 1-3, S3-161353.
GSM Association, "RSP Technical Specification Version 2.2.1", Official Document SGP .22, Dec. 18, 2018, pp. 1-250.
Samsung, "Support for Provisioning Profile for Credential Provisioning", 3GPP TSG SA WG3 (Security) Meeting #86Bis, Mar. 27-31, 2017, pp. 1-4, S3-170798.

* cited by examiner

PROVISION OF APPLICATION LEVEL IDENTITY

TECHNICAL FIELD

Embodiments presented herein relate to methods, a communication device, an ID backend server, computer programs, and a computer program product for provisioning of an application level identity from the ID backend server to the communication device.

BACKGROUND

Proper security mechanisms are needed to prevent misuse of communication devices, such as Internet of Things (IoT) devices and other types of connected devices, such as mobile phones and the like. Communication devices might further be entrusted with valuable, sensitive, or private data that needs to be protected from unauthorized access. A communication device might need an identity to be able to identify and authenticate itself to its counterparts in order to establish secure communication to other devices or services. This is needed at the connectivity layer when connecting to a network and at the application layer when connecting to a service. Secure communication protects sensor data, or control data for actuators, but is also needed for provisioning of identities to the communication device and for secure configuration of the communication device including secure firmware update. Identities are also the base for an access control mechanism controlling what entity is allowed to access resources of the communication device, including what entity is allowed to provision additional identities to the communication device.

For example, different technologies for provisioning of identities to the communication device might be based on private keys with associated certificates or raw public keys, symmetric pre-shared keys, etc. Particular identities might by the communication device be used within an ecosystem or service and such an identity might be provisioned to the communication device during bootstrapping and configuration of the communication device.

A communication device, or module within the communication device, might be equipped with a root (master) identity during its manufacturing. This identity might be used in secure provisioning of other identities to the communication device.

Management, including, but not limited to, identity provisioning, for many different types of communication devices with different types of root identities, might be performed from a platform, e.g. an IoT cloud computational environment platform, in the network. Such root identity technologies might not have the right interfaces to make them suitable for the application identity provisioning using established secure communication procedures.

Hence, there is still a need for an improved handling of identities of communication devices.

SUMMARY

An object of embodiments herein is to provide efficient handling of the application level identity of a communication device.

This object is generally achieved by a method according to the first aspect.

According to a first aspect there is presented a method for provisioning of an application level identity from an ID backend server to a communication device. The provisioning of the application level identity is protected using TLS-, DTLS-, or OSCORE-based secure communication. The communication device comprises an identity module configured for interaction according to GSMA RSP based remote subscription profile download. The method is performed by the communication device. The method comprises transmitting a first message to the ID backend server to establish secure communication with the ID backend server. The first message comprises an identity module challenge. The method comprises receiving a second message from the ID backend server as part of establishing secure communication with the ID backend server. The second message comprises and an ID backend signature for authentication of the ID backend at the communication device. The method comprises transmitting a third message to the ID backend server as part of establishing secure communication with the ID backend server. The third message comprises an identity module signature for authentication of the communication device at the ID backend. The method comprises receiving a fourth message from the ID backend server. The fourth message comprises the application level identity information and is protected using the established secure communication with the ID backend server.

According to a second aspect there is presented a communication device for provisioning of an application level identity from an ID backend server to the communication device. The provisioning of the application level identity is protected using TLS-, DTLS-, or OSCORE-based secure communication. The communication device comprises an identity module configured for interaction according to GSMA RSP based remote subscription profile download. The communication device further comprises processing circuitry. The processing circuitry is configured to cause the communication device to transmit a first message to the ID backend server to establish secure communication with the ID backend server. The first message comprises an identity module challenge. The processing circuitry is configured to cause the communication device to receive a second message from the ID backend server as part of establishing secure communication with the ID backend server. The second message comprises and an ID backend signature for authentication of the ID backend at the communication device. The processing circuitry is configured to cause the communication device to transmit a third message to the ID backend server as part of establishing secure communication with the ID backend server. The third message comprises an identity module signature for authentication of the communication device at the ID backend. The processing circuitry is configured to cause the communication device to receive a fourth message from the ID backend server. The fourth message comprises the application level identity information and is protected using the established secure communication with the ID backend server.

According to a third aspect there is presented a communication device for provisioning of an application level identity from an ID backend server to the communication device. The provisioning of the application level identity is protected using TLS-, DTLS-, or OSCORE-based secure communication. The communication device comprises an identity module configured for interaction according to GSMA RSP based remote subscription profile download. The communication device further comprises a transmit module configured to transmit a first message to the ID backend server to establish secure communication with the ID backend server. The first message comprises an identity module challenge. The communication device further comprises a receive module configured to receive a second message from the ID backend server as part of establishing secure communication with the ID backend server. The second message comprises and an ID backend signature for authentication of the ID backend at the communication device. The communication device further comprises a transmit module configured to transmit a third message to the ID backend server as part of establishing secure communication with the ID backend server. The third message comprises an identity module signature for authentication of the communication device at the ID backend. The communication device further comprises a receive module configured to receive a fourth message from the ID backend server. The fourth message comprises the application level identity information and is protected using the established secure communication with the ID backend server.

According to a fourth aspect there is presented a computer program for provisioning of an application level identity from an ID backend server to a communication device, the computer program comprising computer program code which, when run on processing circuitry of the communication device, causes the communication device to perform a method according to the first aspect.

The object is generally achieved by a method according to the fifth aspect.

According to a fifth aspect there is presented a method for provisioning of an application level identity from an ID backend server to a communication device. The provisioning of the application level identity is protected using TLS-, DTLS-, or OSCORE-based secure communication. The communication device comprises an identity module configured for interaction according to GSMA RSP based remote subscription profile download. The method is performed by the ID backend server. The method comprises receiving a first message from the communication device to establish secure communication with the communication device.

The first message comprises an identity module challenge. The method comprises transmitting a second message to the communication device as part of establishing secure communication with the communication device. The second message comprises an ID backend signature for authentication of the ID backend at the communication device. The method comprises receiving a third message from the communication device as part of establishing secure communication with the communication device. The third message comprises an identity module signature for authentication of the communication device at the ID backend. The method comprises transmitting a fourth message to the communication device. The fourth message comprises the application level identity information and is protected using the established secure communication with the communication device.

According to a sixth aspect there is presented an ID backend server for provisioning of an application level identity from the ID backend server to a communication device. The provisioning of the application level identity is protected using TLS-, DTLS-, or OSCORE-based secure communication. The communication device comprises an identity module configured for interaction according to GSMA RSP based remote subscription profile download. The ID backend server comprises processing circuitry. The processing circuitry is configured to cause the ID backend server to receive a first message from the communication device to establish secure communication with the communication device. The first message comprises an identity module challenge. The processing circuitry is configured to cause the ID backend server to transmit a second message to the communication device as part of establishing secure communication with the communication device. The second message comprises an ID backend signature for authentication of the ID backend at the communication device. The processing circuitry is configured to cause the ID backend server to receive a third message from the communication device as part of establishing secure communication with the communication device. The third message comprises an identity module signature for authentication of the communication device at the ID backend. The processing circuitry is configured to cause the ID backend server to transmit a fourth message to the communication device. The fourth message comprises the application level identity information and is protected using the established secure communication with the communication device.

According to a seventh aspect there is presented an ID backend server for provisioning of an application level identity from the ID backend server to a communication device. The provisioning of the application level identity is protected using TLS-, DTLS-, or OSCORE-based secure communication. The communication device comprises an identity module configured for interaction according to GSMA RSP based remote subscription profile download. The ID backend server comprises a receive module configured to receive a first message from the communication device to establish secure communication with the communication device. The first message comprises an identity module challenge. The ID backend server comprises a transmit module configured to transmit a second message to the communication device as part of establishing secure communication with the communication device. The second message comprises an ID backend signature for authentication of the ID backend at the communication device. The ID backend server comprises a receive module configured to receive a third message from the communication device as part of establishing secure communication with the communication device. The third message comprises an identity module signature for authentication of the communication device at the ID backend.

The ID backend server comprises a transmit module configured to transmit a fourth message to the communication device. The fourth message comprises the application level identity information and is protected using the established secure communication with the communication device.

According to an eight aspect there is presented a computer program for provisioning of an application level identity from an ID backend server to a communication device. The computer program comprises computer program code which, when run on processing circuitry of the ID backend server, causes the ID backend server to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these communication devices, these ID backend servers, and these computer programs provide efficient handling of the application level identity of the communication device.

Advantageously these methods, these communication devices, these ID backend servers, and these computer programs allow existing identity modules also to be used as root identity for the communication device, allowing download of new application level identities.

Advantageously these methods, these communication devices, these ID backend servers, and these computer programs integrates well with LwM2M protocols where TLS, DTLS or OSCORE can be used to secure communication between a device (as defined by the communication device) and a bootstrap server or management server (as defined by the ID backend server).

The use of the identity module identity as root identity lowers the cost and complexity of the communication device and the complexity around managing identities for the communication device during manufacturing.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown.

This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art.

Like numbers refer to like elements throughout the description. Any step or feature illustrated by dashed lines should be regarded as optional.

An identity module manufacturer manufactures an identity module and at this point the identity module is provisioned with an identity module identity. Such an identity module identity might comprise an identity module identifier (EID), an identity module private key, and an identity module certificate. The identity module certificate contains the public key corresponding to the identity module private key. The identity module is also configured with at least one root certificate authority (CA) certificate (or only its public key to save space) for use in authenticating various servers to which it communicates.

Figure 1:
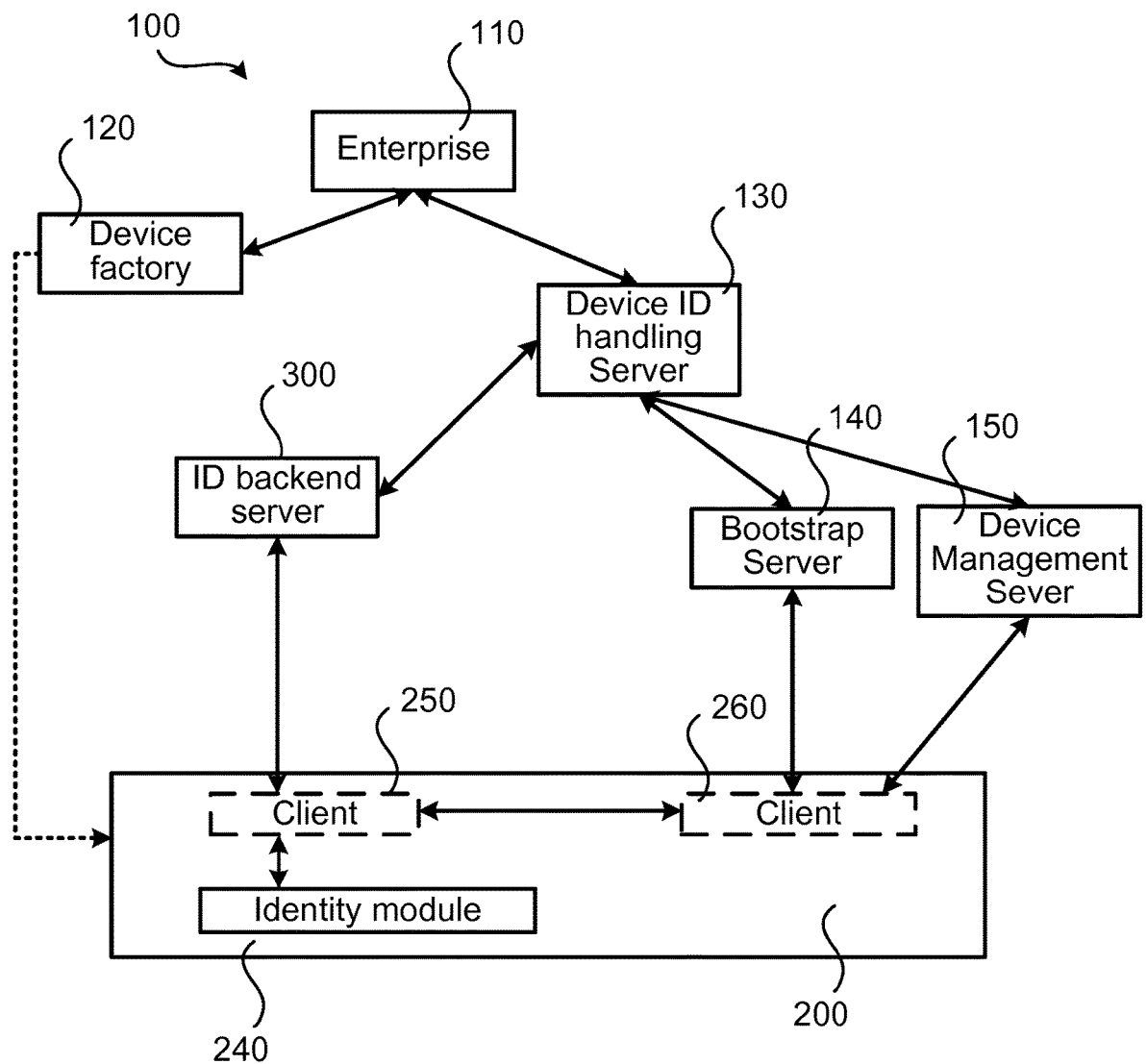
FIG. 1 is a schematic diagram illustrating a communication system according to embodiments.

FIG. 1 is a schematic diagram illustrating a communications system 100 where embodiments presented herein can be applied.

The identity module 240 is from the identity module manufacturer provided either to a cellular module maker, where it is included into a radio communication module as part of radio communication module manufacturing, or directly to the device manufacturer. In FIG. 1, the cellular module maker and the device manufacturer are collectively identified by means of the device factory 120. During the device manufacturing the identity module 240 is included as part of a communication device 200, e.g. by directly soldering the identity module 240 to a printed circuit board (PCB) in the communication device 200 or by including a radio communication module obtained from a radio communication module maker. At device manufacturing the communication device 200 might be configured with a device identifier such as IMEI and the necessary software for handling identities of the communication device 200 and for performing other services/task according to the configuration of the enterprise 110 that ordered the communication devices 200. In particular, as shown in FIG. 1, the communication device 200 comprises a device ID handling client 250 for handling identities of the communication device 200, and a device management client 260 for handling device management and potential device bootstrapping following completed handling of identities of the communication device 200. A LwM2M client is an example of a device management client supporting also device bootstrapping.

An ID backend server 300 is used for handling identities of the communication device 200.

The ID backend server 300 might be hosted by the device manufacturer, the identity module manufacturer, or a third party as certified by the root CA.

The communication device 200 is commercially bought by an enterprise 110. The enterprise 110 uses a service for handling identities of the communication device 200 and device management service including bootstrap service. These services are illustrated in FIG. 1 by a device ID handling server 130, a device management server 150, and a bootstrap server 140.

These services might belong to the enterprise 110 or be licensed from a third party. The services might be co-located with one or more common server(s). Examples of device management servers and bootstrap servers are LwM2M servers and LwM2M bootstrap servers, respectively. The device ID handling services and the device management (including the bootstrap) services might be part of one and the same platform or they might be part of different platforms.

As disclosed above an improved handling of identities of communication devices 200.

In some aspects there is provided a communication device 200 equipped with an identity module 240 for use in authentication during network access, and where the identity module identity for use in cellular subscription download (or SIM profile download) is also used as a root identity for bootstrapping an application level identity to the communication device 200.

After successful provisioning, this identity might be used as a base for further identity provisioning via the platform.

In some aspects, the platform provides its Uniform Resource Locator (URL) and credentials and identifier associated with the application level identity to a provisioning server capable of provisioning application level identities leveraging the identity module identity. This provisioning server is referred to as the ID backend server 300. As the communication device 200 starts up for the first time, the communication device 200 connects to the ID backend server 300 and secure communication is established between the communication device 200 and the ID backend server 300. The URL of the ID backend server 300 is known to the device from manufacturing. The URL of the ID backend server 300 may be configured into the communication device 200 during device manufacturing or it may be configured into the identity module 240 during identity module manufacturing. The latter case may be applicable when the identity module manufacturer is providing or licensing the ID backend server 300.

The identity module identity and the public key infrastructure (PKI) infrastructure of remote profile download can be used during establishment of secure communication when authenticating the communication device 200 at the ID backend server 300 and for authenticating the ID backend server 300 at the communication device 200. After successful authentication and secure communication establishment, the application level identity and platform URL can be securely provided to the communication device 200. The communication device 200 can then use the provisioned information to establish secure communication with the platform where potentially additional identity provisioning might be performed There could be different examples of communication devices 200. In some examples the communication device 200 is any of a portable wireless device, mobile station, mobile phone, handset, wireless local loop phone, user equipment (UE), smartphone, laptop computer, tablet computer, wireless modem, wireless sensor device. IoT device, network equipped sensor, or network equipped vehicle.

In some embodiments, TLS or DTLS is used for establishing secure communication between the communication device 200 and the ID backend server 300. The TLS protocol or the DTLS protocol can be adapted such that the identity module identity and the PKI of remote profile download can be utilized.

In some embodiments, OSCORE is used for establishing secure communication between the communication device 200 and the ID backend server 300. In such embodiments the EDHOC protocol can be used for establishing a shared secret (also known as OSCORE master secret) between the communication device 200 and the ID backend server 300, where the shared secret is then used when establishing the OSCORE based secure communication.

In some examples the communication device 200 is a LwM2M client and the ID backend server 300 is a LwM2M bootstrap server. The identity module identity and PKI of remote profile download can then be utilized for establishment of secure communication to provision the application level identity according to LwM2M protocols, either relying on TLS or DTLS or OSCORE for the secure communication.

The embodiments disclosed herein relate to mechanisms for provisioning of an application level identity from an ID backend server 300 to a communication device 200. In order to obtain such mechanisms there is provided a communication device 200, a method performed by the communication device 200, a computer program product comprising code, for example in the form of a computer program, that when run on processing circuitry of the communication device 200, causes the communication device 200 to perform the method. In order to obtain such mechanisms there is further provided an ID backend server 300, a method performed by the ID backend server 300, and a computer program product comprising code, for example in the form of a computer program, that when run on processing circuitry of the ID backend server 300, causes the ID backend server 300 to perform the method.

One example of a method for device ID handling of the communication device 200 will now be described with reference to the signalling diagram of FIG. 2.

S1: A batch of communication devices 200 are produced at device manufacturing, according to what was described above. The ID backend server 300 is provisioned with the device identifiers of the produced communication devices 200. An example of such a device identifier is the IMEI, but also a module identifier, or the identity module identifier (EID) may be used as device identifier for the purpose of device ID handling. In case the identity module identifier (EID) is not used directly as device identifier, the ID backend server 300 is also configured with the identity module identifier (EID) linked to each device identifier such that the ID backend server 300 can map between the two identifiers.

S2: The enterprise 110 that bought the communication devices 200 receives the communication devices 200 along with a list of device identifiers. The enterprise 110 also receives the URL of the ID backend server 300.

S3: The enterprise 110 configures and/or provides the device ID handling server 130 with the URL of the ID backend server 300 and the list of device identifiers for its communication devices 200.

S4: The device ID handling server 130 becomes aware of the bootstrap server URL and credentials used by the bootstrap server. This includes the type of credentials used and possibly also values depending on the type. The credential handling is described in more detail below. Step S4 might be performed earlier, even before step S1.

S5: The device ID handling server 130 provides the bootstrap server URL, credential information, and list of device identifiers for its communication devices 200 to the ID backend server 300. Depending on the credential type and what entity that generates the credentials, the ID backend server 300 may generate and/or derive credentials and credentials information may be returned to the device ID handling server 130.

S6: In case credential information is returned in step S5, the device ID handling server 130 forwards this information to the bootstrap server.

S7: The ID backend server 300 stores information (the bootstrap server URL and credential information) in its database for each communication device 200 (indexed by its device identifier). This step might be performed in parallel with steps S5 and/or S6.

S8: A communication device 200 is installed and started up for the first time. The communication device 200 obtains network connectivity. This may be local connectivity based on Bluetooth, WiFi, or similar radio connectivity, or it may be connectivity using a wide area network such as a cellular network. In this case the identity module 240 is pre-provisioned with a SIM profile providing initial connectivity such that the communication device 200 is enabled to bootstrap. The device ID handling client of the communication device 200 starts the bootstrap procedure by connecting to the ID backend server 300. If the ID backend server URL is configured in the identity module 240, the communication device 200 obtains the ID backend server URL from the identity module 240.

S9: Secure communication is established between the ID backend server 300 and the communication device 200 in which mutual authentication is performed where the identity module identity is utilized. The details for the establishment of secure communication are below with references to FIG. 3, FIG. 4, FIG. 5, and FIG. 6. During secure communication establishment, the identity module identifier (EID) of the communication device 200 is obtained from the communication device 200. For example, the identity module identifier (EID) may be part of the identity module certificate delivered to the ID backend server 300 and verified by the ID backend server 300 as part of authenticating the communication device 200.

S10: The ID backend server 300 maps the identity module identifier (EID) obtained in step S9 to a device identifier for which data to be provisioned to the communication device 200 has been recorded in step S7. The ID backend server 300 provisions the bootstrap server URL and credentials and/or credential information for use when securely connecting to the bootstrap server in step S12. Depending on the type of credentials used, the communication device 200 itself may be involved in the generation of credentials.

S11: The device ID handling client of the communication device 200 provides the bootstrap server URL and credential information to the device management client of the communication device 200.

S12: The device management establishes secure communication with the bootstrap server using the URL and credential information. In case of raw public key (RPK) being used the bootstrap server may verify the public key at the ID backend server 300.

S13: The bootstrap server provisions additional identity information to the communication device 200 for use in connecting to various servers for device management, data management, etc. Following the successful provisioning the communication device 200 can then start to securely communicate with the various servers.

There are different possibilities regarding what credentials to use to establish secure communication between the communication device 200 and the bootstrap server. Below are given some examples.

According to a first example, a PSK shared between the communication device 200 and bootstrap server is used. The PSK is then provisioned to the communication device 200 in step S10. The PSK may be generated randomly for each communication device 200 by either the ID backend server 300, the device ID handling server 130, or the bootstrap server itself.

Depending where the PSKs are generated the PSKs are shared in steps S4-S6 such that both bootstrap server and ID backend server 300 are aware of them. The PSK may also be derived from a master PSK and e.g. the device identifier. The derivation may be performed either at the ID backend server 300, the device ID handling server 130, and/or at the bootstrap server.

Depending where the master PSK is generated, the master PSK is shared in steps S4-S6 such that both bootstrap server and ID backend server 300 are aware of it (or the derived PSKs).

According to a second example, the bootstrap server has a private-public key pair and a certificate for use in establishing secure communication. Information about the root certificate authority (CA) certificate (which the bootstrap server certificate chains back to) is provided from bootstrap server via the device ID handling server 130 and ID backend server 300 to the communication device 200 (steps S4-S6 and S10). The communication device 200 is also provided with a private-public key pair and a certificate in step S10. The key pair may be generated by the communication device 200 itself or by the ID backend server 300 or during the device ID handling process. The ID backend server 300 and the device ID handling process also make sure a communication device 200 certificate is generated and provided to the communication device 200. It could be the ID backend server 300 or the device ID handling server 130 itself acting as CA, or a third party is utilized as CA. In the case the key pair is generated outside the communication device 200 it may also be pre-generated as part of step S5. In the case the communication device 200 itself generates the key pair the ID backend server 300 might ensures a device certificate is generated and provided to the communication device 200. Information about the root CA for the device certificates is provided to the bootstrap server as part of steps S4-S6.

According to a third example, the bootstrap server has a private-public key pair for use in establishing secure communication. The public key or its hash is provided from the bootstrap server to the ID backend server 300 and further to the device in steps S4-S6 and S10. Each communication device 200 also has a private-public key pair. The key pair may be generated by the communication device 200 itself or by the ID backend server 300 or during the device ID handling process. The public keys, or their hashes, are provided to the bootstrap server as part of steps S4-S6. In case the communication device 200 itself generates the public keys as part of step S10, the ID backend server 300 might store the public keys (or their hashes) in its database and provides a function to the bootstrap server for verification of public keys as the bootstrap server receives them from the communication device 200 in step S12.

Figure 3:
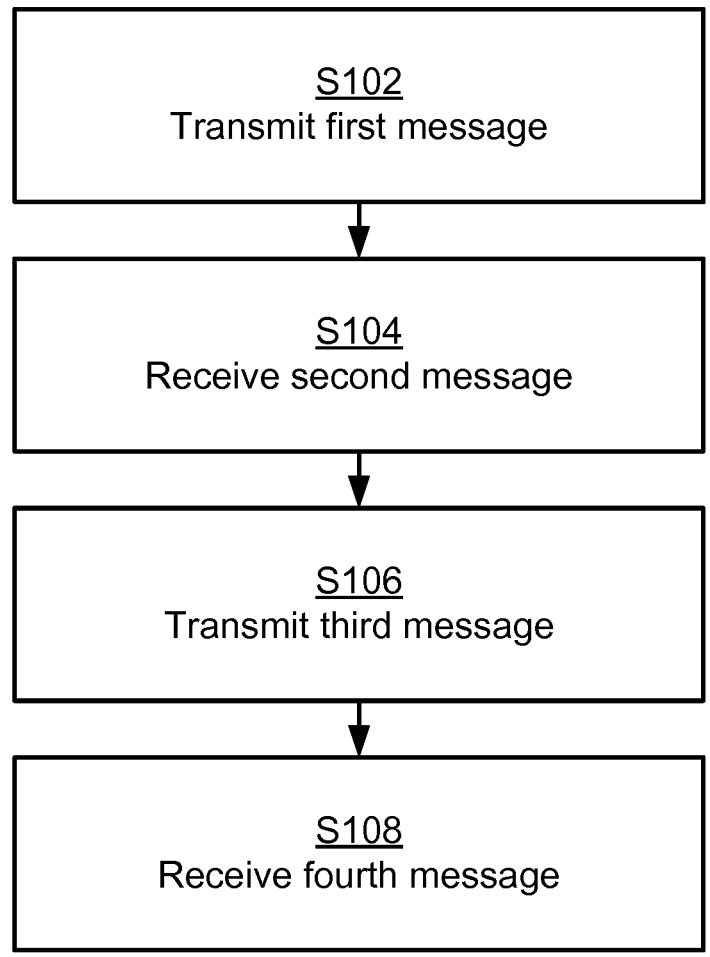
FIGS. 3 and 4 are flowcharts of methods according to embodiments.
Figure 4:
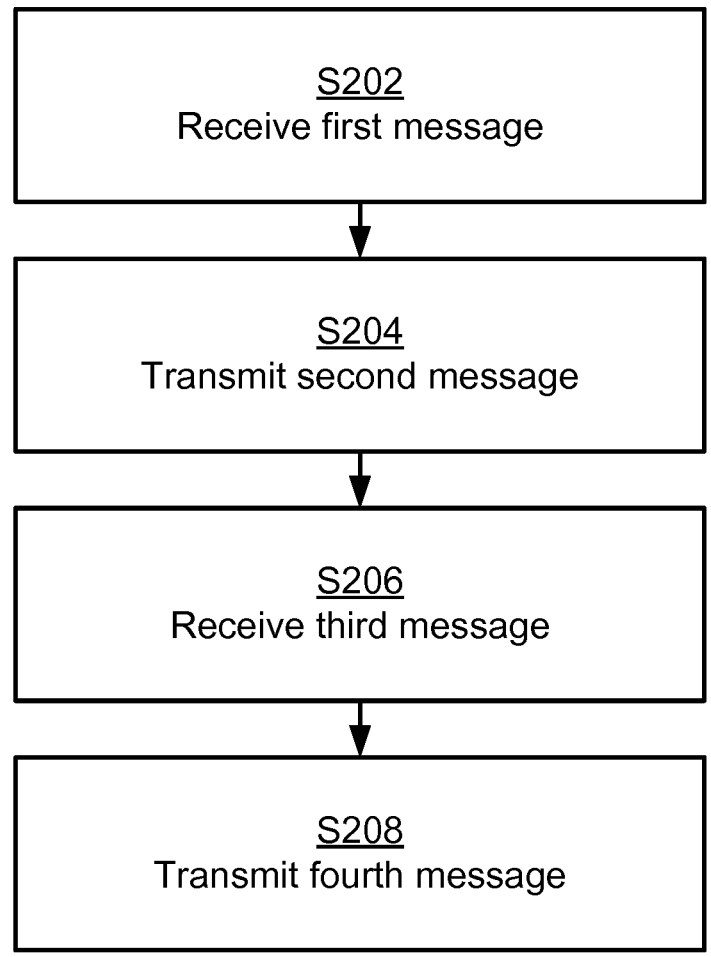
Figure 5:
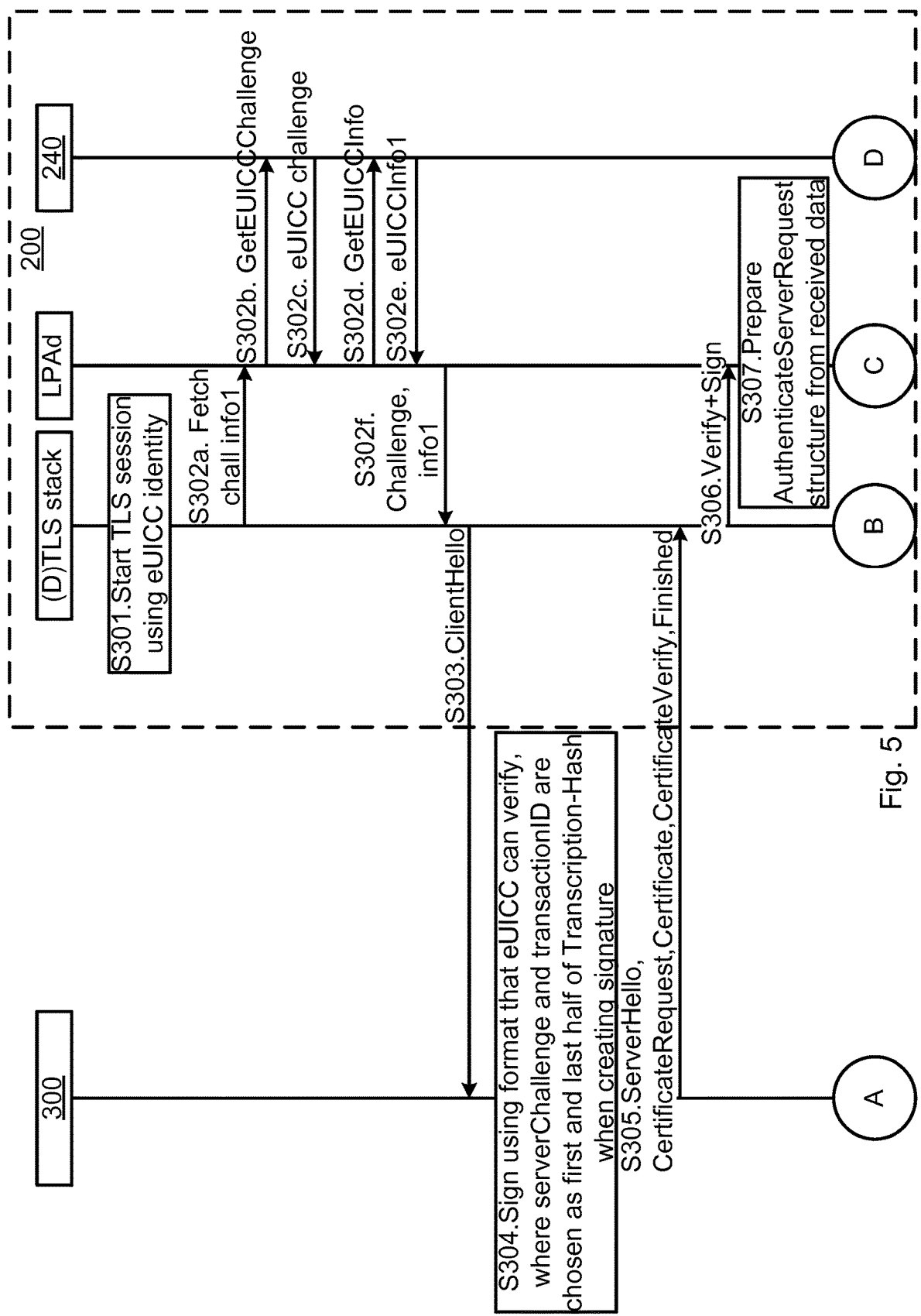
Figure 5:
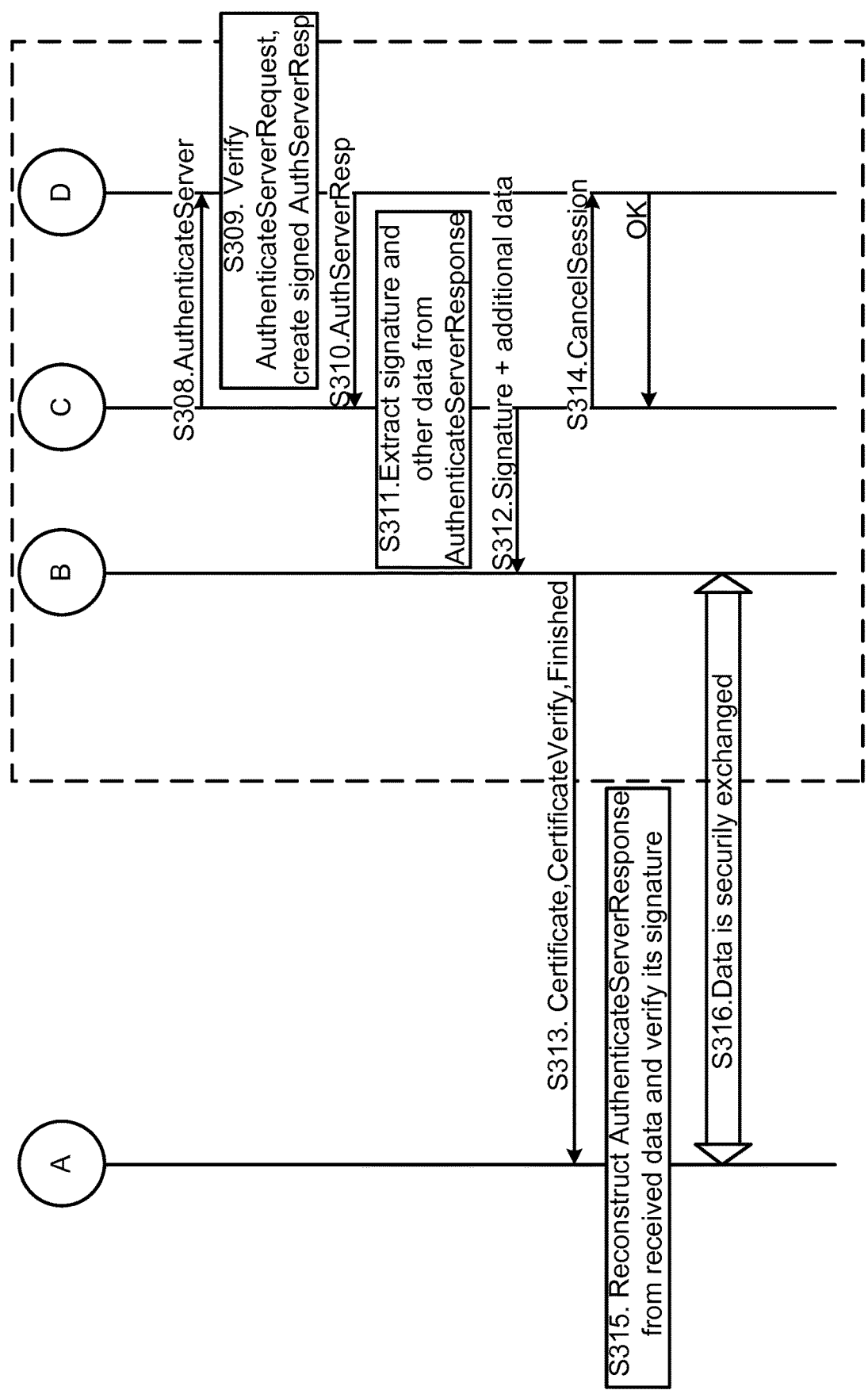
Figure 6:
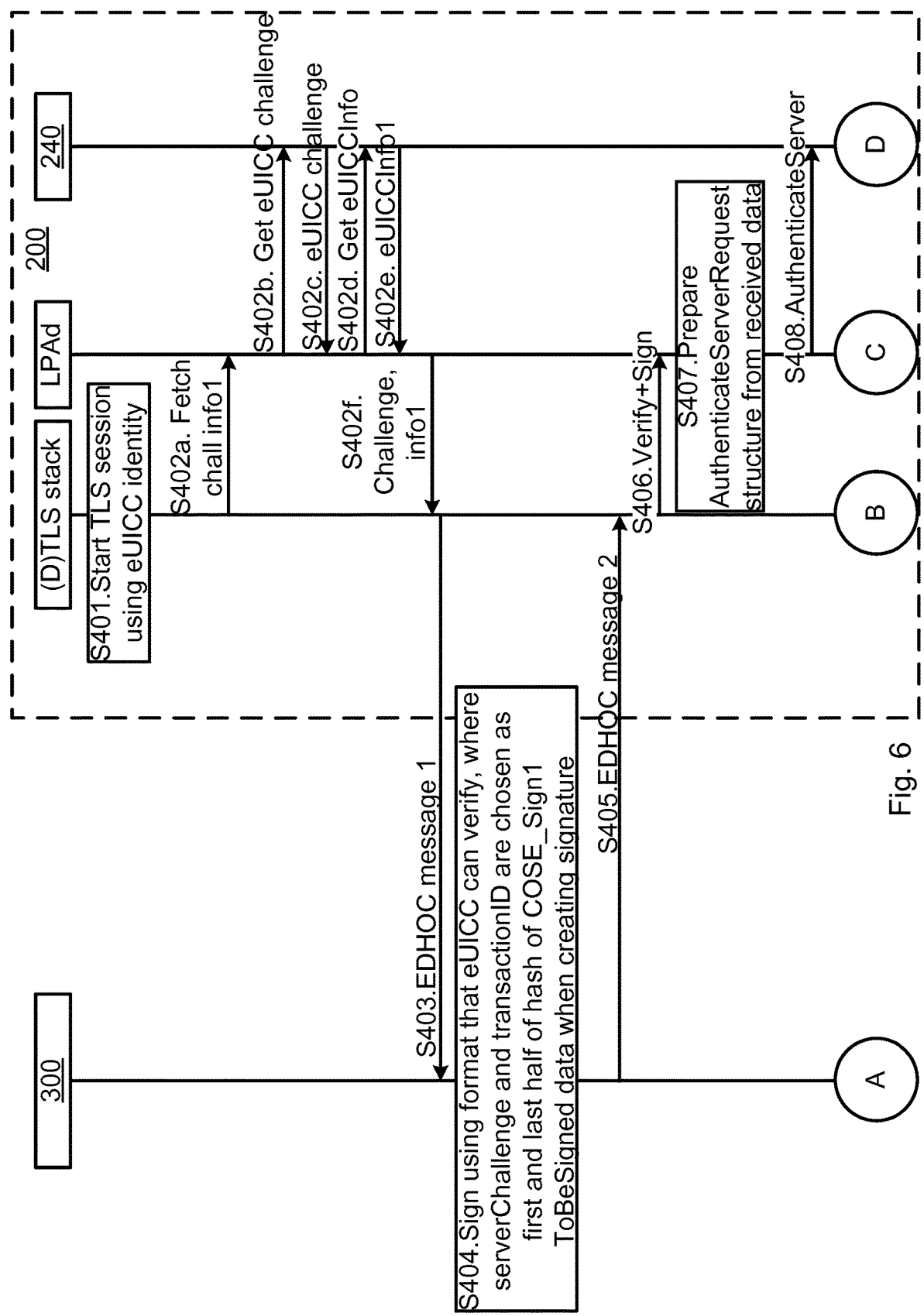
Figure 6:
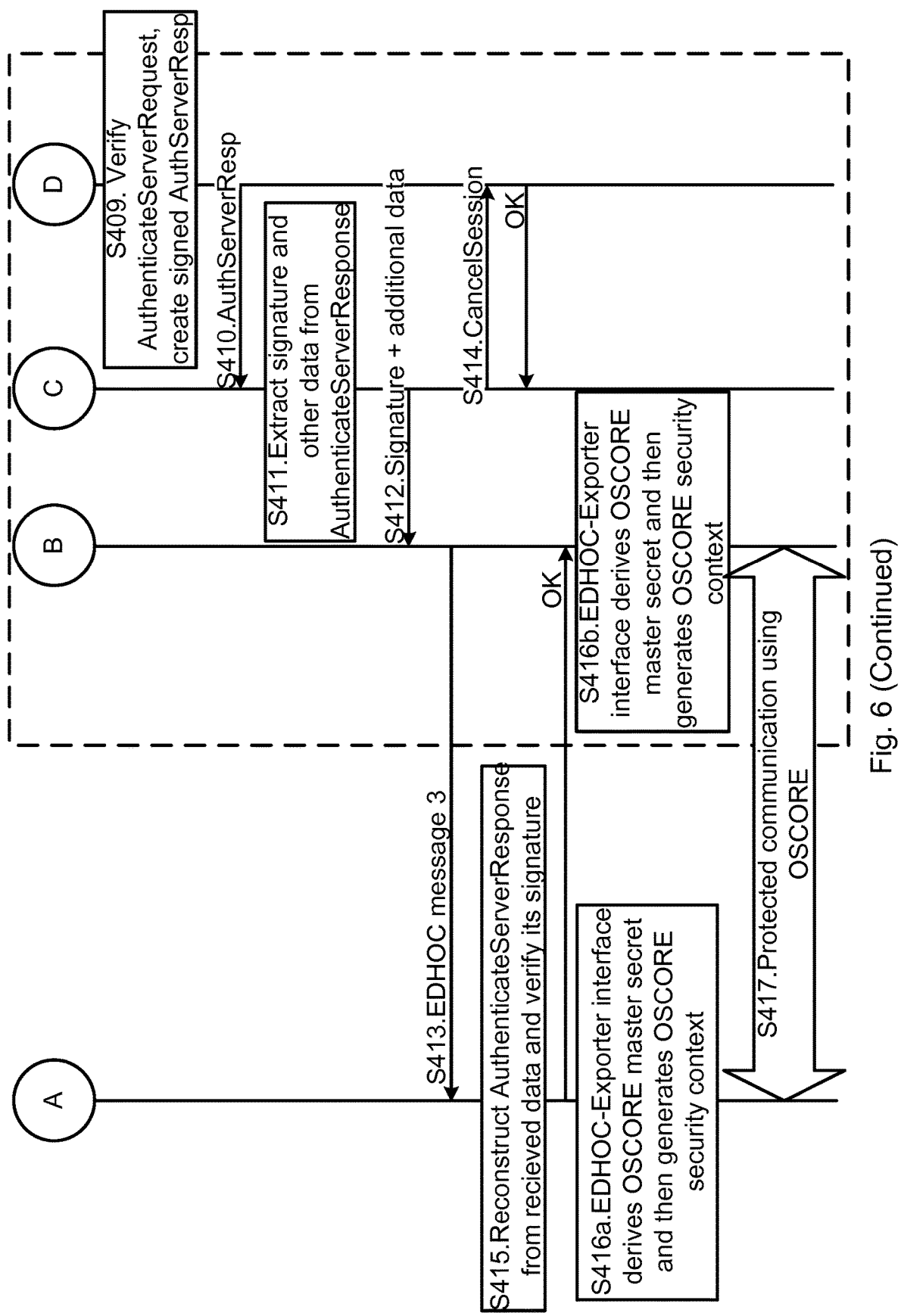

Embodiments relating to further details of the mutual authentication performed where the identity module identity is utilized as in above S9 will now be disclosed with references to FIG. 3 and FIG. 4, and then also with references to FIG. 5 and FIG. 6.

Reference is now made to FIG. 3 illustrating a method for provisioning of an application level identity from an ID backend server 300 to a communication device 200 as performed by the communication device 200 according to an embodiment.

The provisioning of the application level identity is protected using TLS-, DTLS-, or OSCORE-based secure communication. The communication device 200 comprises an identity module 240 configured for interaction according to GSMA RSP based remote subscription profile download.

S102: The communication device 200 transmits a first message to the ID backend server 300 to establish secure communication with the ID backend server 300. The first message comprises an identity module 240 challenge.

S104: The communication device 200 receives a second message from the ID backend server 300 as part of establishing secure communication with the ID backend server

300. The second message comprises and an ID backend signature for authentication of the ID backend at the communication device 200.

S106: The communication device 200 transmits a third message to the ID backend server 300 as part of establishing secure communication with the ID backend server 300. The third message comprises an identity module 240 signature for authentication of the communication device 200 at the ID backend.

S108: The communication device 200 receives a fourth message from the ID backend server 300. The fourth message comprises the application level identity information and is protected using the established secure communication with the ID backend server 300.

Embodiments relating to further details of provisioning of an application level identity from an ID backend server 300 to a communication device 200 as performed by the communication device 200 will now be disclosed.

In some embodiments, the ID backend signature is based on the identity module 240 challenge and additional exchanged protocol data.

In some embodiments, the ID backend signature is based on data that follows a format used for handling remote subscription profile download to the identity module 240.

In some embodiments, the identity module 240 signature is based on, or computed using, the identity module 240 credentials used for remote subscription profile download.

In some embodiments, the identity module 240 signature is based on data that follows a format used for remote subscription profile download to the identity module 240, and the identity module 240 signature is based on exchanged protocol data.

In some embodiments, the first, second, and third messages to establish secure communication follow the EDHOC protocol.

In some embodiments, the first, second, and third messages to establish secure communication follow the TLS Handshake Protocol or the DTLS Handshake Protocol.

There could be different examples of identity modules 240. In some embodiments, the identity module 240 is a universal integrated-circuit card (UICC), an embedded universal integrated-circuit card (eUICC), or an integrated universal integrated-circuit card (iUICC). An iUICC is an UICC integrated into the modem or application processor System-on-Chip (SoC) realized using some form of trusted execution environment (TEE). The identity module identity might thus be a UICC identity, an eUICC identity, or an iUICC identity.

In some embodiments, the identity module 240 challenge is generated by the identity module 240.

In some embodiments, the first message is a ClientHello message in which at least part of client random data comprises the identity module 240 challenge.

In some embodiments, the first message is an EDHOC message 1 in which the identity module 240 challenge is provided as part of unprotected application data, UAD1.

In some embodiments, the second message comprises an ID backend certificate.

In some embodiments, the ID backend signature and the ID backend certificate are verified by the identity module 240 of the communication device 200 and the identity module 240 signature is created by the identity module 240 of the communication device 200 before the communication device 200 transmits the third message. The identity module 240 signature is then created by the identity module 240 only upon successful verification of the ID backend signature and the ID backend certificate.

In some embodiments, an identity module 240 certificate is obtained from the identity module 240 only upon successful verification of the ID backend certificate and the ID backend signature and successful creation of the identity module signature.

In some embodiments, the additional exchanged protocol data comprises all exchanged TLS or DTLS Handshake Protocol messages up to and including a Certificate message sent from the ID backend server 300 to the communication device 200, and where the ID backend signature is based on the identity module 240 challenge and hash of all exchanged TLS or DTLS Handshake Protocol messages up to and including the Certificate message.

In some embodiments, the exchanged protocol data comprises all exchanged TLS or DTLS Handshake Protocol messages up to and including a CertificateVerify message sent from the ID backend server 300 to the communication device 200. The identity module 240 signature is then based on, or computed using, the hash of all exchanged TLS or DTLS Handshake Protocol messages up to and including the CertificateVerify message.

In some embodiments, the ID backend signature is based on the identity module 240 challenge and the hash of COSE_Sign1 ToBeSigned formatted data comprising the additional exchanged protocol data, where the additional exchanged protocol data is described in detail in relation to FIG. 6.

In some embodiments, the identity module 240 signature is based on the hash of COSE_Sign1 ToBeSigned formatted data comprising the exchanged protocol data, where the exchanged protocol data is described in detail in relation to FIG. 6.

In some embodiments, the third message is provided as a combination of a Certificate message, a CertificateVerify message, and a Finished message. The Certificate message comprises an identity module 240 certificate, and the CertificateVerify message comprises the identity module 240 signature.

In some embodiments, the third message is an EDHOC message 3 and comprises an identity module 240 certificate and the identity module 240 signature.

In some embodiments, the GSMA RSP based remote subscription profile download is defined by the GSMA specification for remote subscription profile download for consumer devices, and/or by the GSMA RSP Technical Specification, up to, and including, version 2.2.1, for remote subscription profile download.

Reference is now made to FIG. 4 illustrating a method for provisioning of an application level identity from an ID backend server 300 to a communication device 200 as performed by the ID backend server 300 according to an embodiment.

As above, the provisioning of the application level identity is protected using TLS-, DTLS-, or OSCORE-based secure communication. The communication device 200 comprises an identity module 240 configured for interaction according to GSMA RSP based remote subscription profile download.

S202: The ID backend server 300 receives a first message from the communication device 200 to establish secure communication with the communication device 200. The first message comprises an identity module 240 challenge.

S204: The ID backend server 300 transmits a second message to the communication device 200 as part of establishing secure communication with the communication device 200. The second message comprises an ID backend signature for authentication of the ID backend at the communication device 200.

S206: The ID backend server 300 receives a third message from the communication device 200 as part of establishing secure communication with the communication device 200. The third message comprises an identity module 240 signature for authentication of the communication device 200 at the ID backend.

S208: The ID backend server 300 transmits a fourth message to the communication device 200. The fourth message comprises the application level identity information and is protected using the established secure communication with the communication device 200.

Embodiments relating to further details of provisioning of an application level identity from an ID backend server 300 to a communication device 200 as performed by the ID backend server 300 will now be disclosed.

In some embodiments, the ID backend signature is based on the identity module 240 challenge and additional exchanged protocol data.

In some embodiments, the ID backend signature is based on data that follows a format used for handling remote subscription profile download to the identity module 240.

In some embodiments, the identity module 240 signature is based on the identity module 240 credentials used for remote subscription profile download.

In some embodiments, the identity module 240 signature is based on data that follows a format used for remote subscription profile download to the identity module 240, and wherein the identity module 240 signature is based on exchanged protocol data.

In some embodiments, the first, second, and third messages to establish secure communication follow the EDHOC protocol.

In some embodiments, the first, second, and third messages to establish secure communication follow the TLS Handshake Protocol or the DTLS Handshake Protocol.

In some embodiments, the identity module 240 is a UICC, an eUICC, or an iUICC.

In some embodiments, the second message is provided as a combination of a ServerHello message, a CertificateRequest message, a Certificate message, a CertificateVerify message, and a Finished message. The CertificateRequest message indicates a request for an identity module 240 certificate, the Certificate message comprises an ID backend certificate, and the CertificateVerify message comprises the ID backend signature.

In some embodiments, the second message is an EDHOC message 2 and comprises the ID backend signature and an ID backend certificate.

In some embodiments, the third message comprises an identity module 240 certificate and an identity module 240 signature, and the identity module 240 certificate and identity module 240 signature are verified by the ID backend server 300 before transmitting the fourth message.

In general terms, LwM2M is a protocol for use in device bootstrapping and management of a device. LwM2M includes mechanisms for bootstrapping a device to a device management server (MS) and provisioning of credentials for use in secure communication with the MS. In some embodiments the communication device 200 comprises a LwM2M client and the ID backend server 300 is configured as a LwM2M bootstrap server. The identity module identity and PKI of remote profile download might then be utilized for establishment of secure communication to provision the application level identity according the LwM2M standard.

Figure 2:
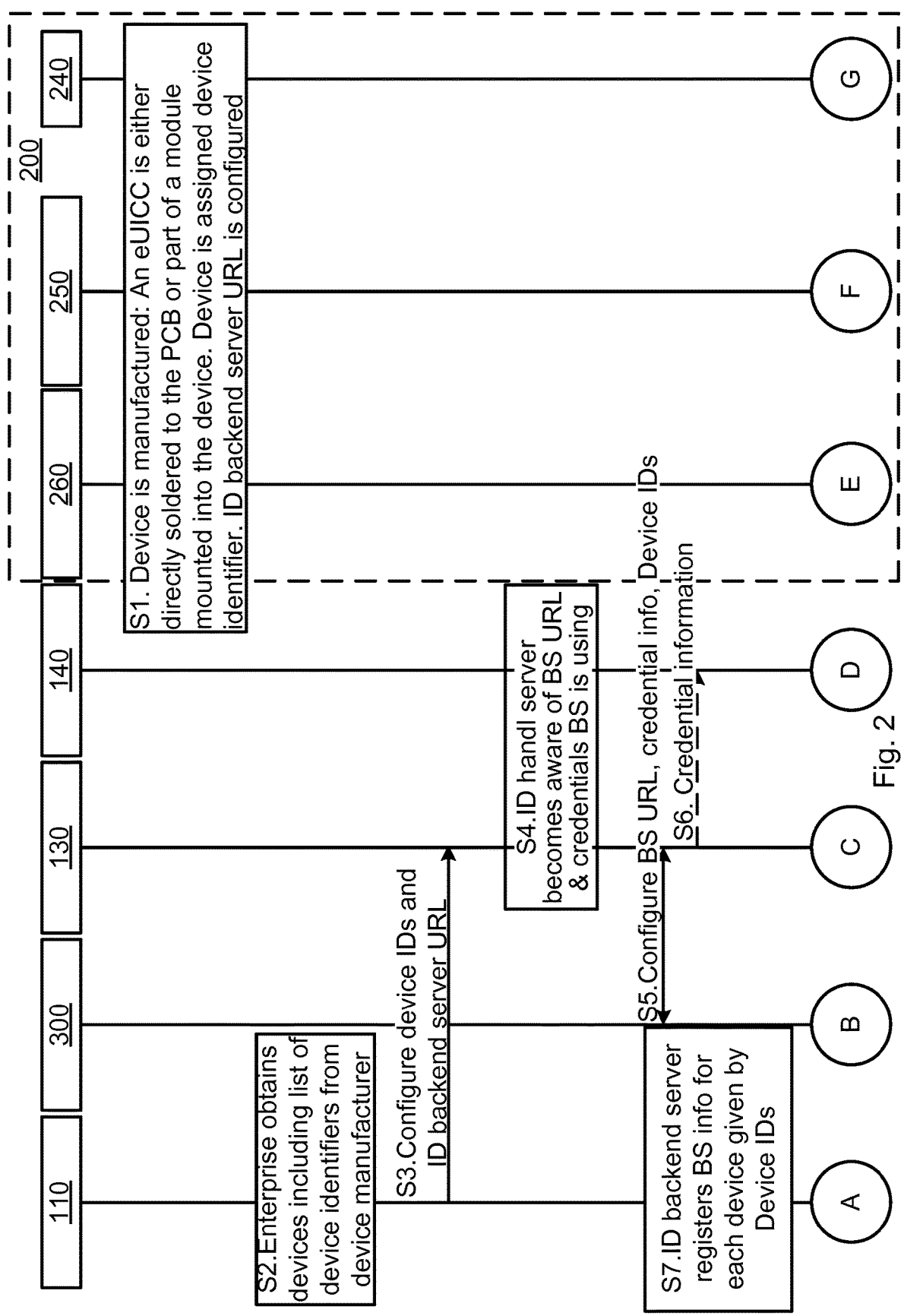
FIGS. 2, 5, and 6 are signalling diagram according to embodiments.
Figure 2:
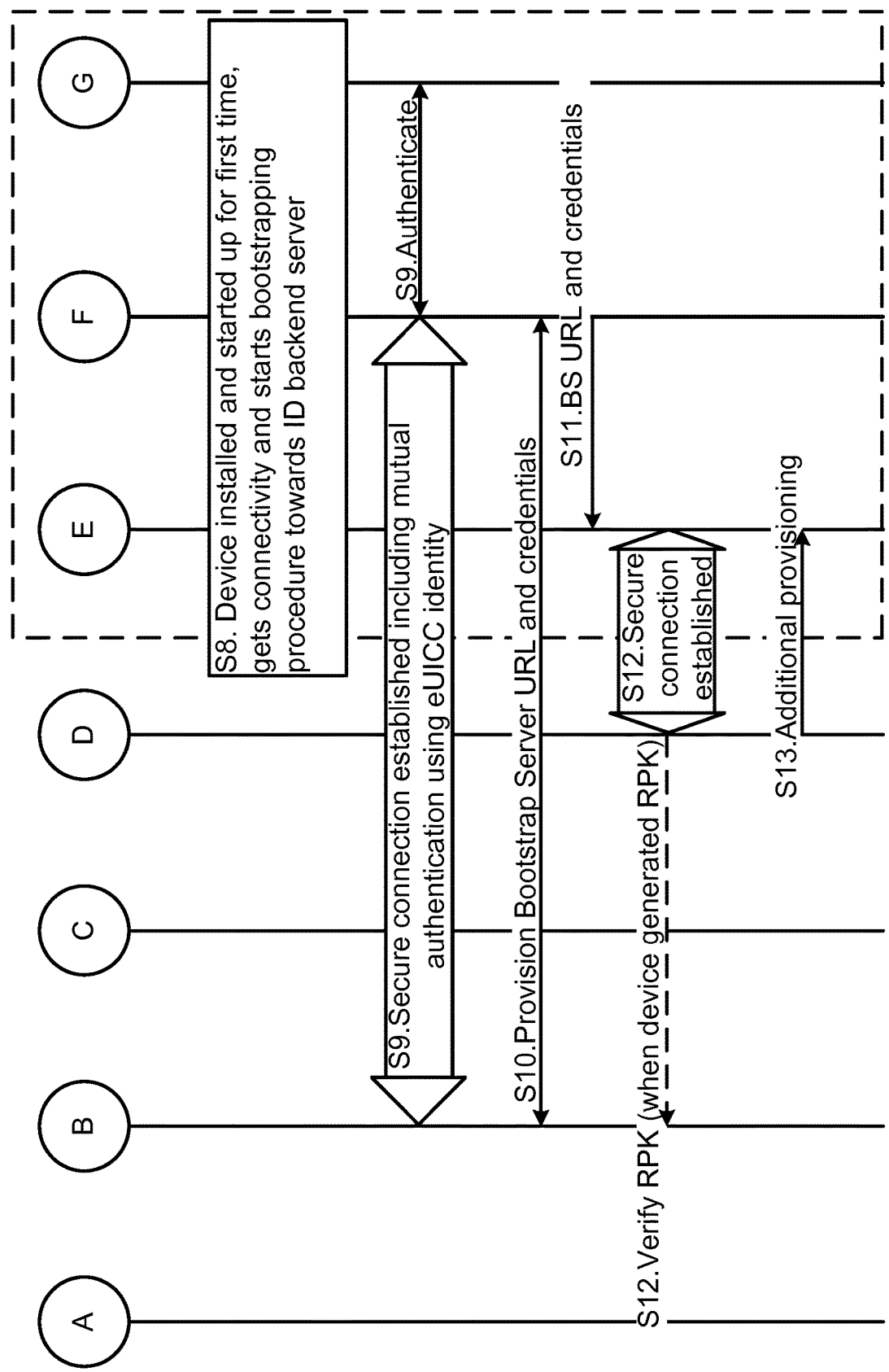

Specifically related to FIG. 2, the device ID handling client and the device management client is realized using a LwM2M client. The ID backend server 300 communicates with the LwM2M client of the communication device 200 using standard LwM2M operations and configures a new LwM2M security object instance and server object instance with information related to the BS and the application level identity. The ID backend server 300 and communication device 200 establish secure communication, either TLS, DTLS, or OSCORE, according to information in LwM2M security and server objects (and possibly also OSCORE object) configured in the device during manufacturing of the device.

Two particular embodiments for provisioning of an application level identity from an ID backend server 300 to a communication device 200 based on at least some of the above disclosed embodiments will now be disclosed in detail with reference to the signalling diagrams of FIG. 5 and FIG. 6.

In these embodiments is considered secure communication establishment between the communication device 200 and the ID backend server 300 where the eUICC identity is used for mutual authentication. In a first embodiment TLS or DTLS is used and in a second embodiment OSCORE-EDHOC is used. The existing eUICC has a well-defined interface for profile download and management, and adaptations of TLS or DTLS and EDHOC are made to be able to use the existing eUICC. The ID backend server URL may be stored in the eUICC and must then be read from the eUICC before communication can be established with the ID backend server 300. For example, the default SM-DP+ address may contain the ID backend server URL and may be requested in steps S302 and S402, similar to other data.

Reference is now made to the signalling diagram of FIG. 5 for description of the first particular embodiment.

The ID backend server 300 is here assumed to comprise a standard TLS or DTLS server that is modified to generate and verify signatures in the GSMA RSP format. TLS and DTLS are similar and in FIG. 5 TLS version 1.3 is used. The skilled person would understand how the message passing would be for earlier versions of TLS (and DTLS). Further, what is disclosed with reference to FIG. 5 are only those steps concerning mutual authentication where there is a difference due to the use of the eUICC identity.

S301: The device ID handling client in the communication device 200 trigger its TLS client to start a TLS session using the eUICC identity.

S302 (S302a, S302b, S302c, S302d, S302e, S302f): The TLS stack requests an eUICC challenge and eUICC info1 from the device Local Profile Assistant (LPAd) assisting in SIM profile download and management. The LPAd interacts with the eUICC to obtain the eUICC challenge and eUICC info1 that are returned to the TLS stack. The eUICC challenge is a 16-byte random number and eUICC info 1 provides information about supported CAs for signing and verification at the eUICC.

S303: The TLS stack prepares a ClientHello message in which it replaces 16 bytes of its client random (e.g. 16 first bytes) with the eUICC challenge. It may also include the eUICC info 1 message as a TLS extension. Alternatively, the eUICC info 1 is already known at the ID backend server 300 (e.g. configured as part of above step S5). The SignatureScheme extension may be used to indicate the use of GSMA RSP formatted signatures. The ClientHello message is forwarded to the ID backend server 300.

S304: The ID backend server 300 extracts necessary data from the ClientHello message and prepares a response consisting of ServerHello, CertificateRequest, Certificate, CertificateVerify, and Finished messages. The ServerHello message may comprise the SignatureScheme extension indicating GSMA RSP formatted signatures. The CertificateRequest message is included to request the TLS client certificate, i.e. the eUICC certificate. The CertificateRequest may also include a TLS extension indicating which root CA, in case there are many supported in the eUICC, to which the eUICC certificate should chain. The Certificate message contains the ID backend server 300 certificate, formatted as an SM-DP+ certificate for authentication such that it is accepted by the eUICC. The CertificateVerify message contains the ID backend server 300 signature of the Transcription-Hash (32-bytes), i.e. a hash of all TLS handshake messages up to and including the Certificate message. The signature is calculated according to GSMA RSP on the serverSigned1 structure.

The eUICCChallenge field of serverSigned1 is obtained from the TLS client random (from the ClientHello message) and the serverChallenge is chosen as the 16 first bytes of the Transcription-Hash. The transactionID of serverSigned1 is chosen as the remaining 16 bytes of the Transacription-Hash. The serverAddress is chosen as the URL of the ID backend server 300.

S305: The ServerHello, CertificateRequest, Certificate, CertificateVerify, and Finished messages are sent to the communication device 200.

S306: The TLS stack verifies the received messages and starts generating the client response.

As part of verifying the received messages and generating the client response the TLS stack calls the LPAd to verify the ID backend server 300 signature and certificate and create the device signature. The following data is provided: eUICCChallenge (cached at the TLS stack), computed Transcription-Hash on the same data as signed by the ID backend server 300, ID backend server 300 URL, the ID backend server 300 certificate, ID backend server 300 signature, Transcription-Hash as to be signed by the device, indication of root CA (subjectKeyIdentifier) to which the eUICC certificate should chain.

S307: The LPAd constructs an GSMA RSP formatted AuthenticateServerRequest structure from the received data. The AuthenticateServerRequest comprises serverSigned1, ID backend signature (i.e. serverSignature1), euiccCiPKIdToBeUsed, the ID backend certificate (i.e. serverCertificate), and ctxParams1. The serverSigned1 structure is constructed according to description in step S304. A new ctxParams1 structure is used where the Transcription-Hash to be signed by the communication device 200 is included. If no subjectKeyIdentifier was provided by the ID backend server 300, the LPAd selects the first value in the list provided in eUICC info 1 (obtained from eUICC in step S302) and includes as euiccCiPKIdToBeUsed in the AuthenticateServerRequest.

S308: The LPAd invokes the GSMA RSP AuthenticateServer command at the eUICC with the AuthenticateServerRequest structure.

S309: The eUICC verifies the AuthenticateServerRequest to authenticate the ID backend server 300. If successful verification, the eUICC creates the GSMA RSP formatted AuthenticateServerResponse structure containing the eUICC certificate, EUM certificate, euiccSigned1 structure, and the eUICC signature calculated using the eUICC private key on the euiccSigned1 formatted data. The euiccSigned1 data comprises ctxParams1, eUICC info2, transactionId, serverChallenge, and serverAddress.

S310: The AuthenticateServerResponse structure is returned to the LPAd.

S311: The LPAd extracts the eUICC signature, eUICC info2, eUICC certificate, and the EUM certificate from the AuthenticateServerResponse structure, where eUICC info2 is part of the euiccSigned1 structure.

S312: The extracted data is provided to the TLS stack that constructs a response. The Certificate message contains the eUICC certificate followed by the EUM certificate, and the signature part of the CertificateVerify message is the eUICC signature concatenated with the eUICC info2 structure.

S313: The response consisting of Certificate, CertificateVerify, and Finished messages is sent to the ID backend server 300.

S314: In parallel, the LPAd sends a cancelSession message to reset the eUICC such that it is ready for new sessions (TLS, or profile download).

S315: As part of verifying the response received in step S313, the ID backend server 300 reconstructs the parts of the AuthenticateServerResponse structure needed for verification from data in the Certificate and CertificateVerify messages, cashed data (serverChallenge and transactionId), and computed Transcription-Hash on the same protocol data as signed by the identity module. The ID backend server 300 verifies the data including the eUICC signature, eUICC certificate, and EUM certificate.

S316: Upon successful verification, a secure connection is established following standard TLS protocol procedures, and data can now be securely exchanged.

The eUICC might not allow to read out eUICC certificate and EUM certificate without performing a signature operation. For this reason, the Certificate message should be left out when computing the Transcription-Hash to be signed by the eUICC. Alternatively, these certificates are configured to the LPAd/TLS stack at device/module manufacturing such that the Certificate Message can be constructed prior to calling the LPAd in step S306, allowing it to be included in the Transcription-Hash.

If a hash algorithm is used producing more than 32 bytes, then truncation is used and the 32 first bytes are used as Transcription-Hash.

Reference is now made to the signalling diagram of FIG. 6 for description of the second particular embodiment.

In this embodiment it is assumed that the constrained application protocol (CoAP) is used for communication between the ID backend server 300 and the communication device 200. It is further assumed that Object Security for Constrained RESTful Environments (OSCORE) is used to protect the communication. OSCORE protects the CoAP request and response messages sent between the two parties. In order to use OSCORE the two parties must share a secret that is referred to as the OSCORE master secret. The Ephemeral Diffie-Hellman Over COSE (EDHOC) protocol is used to establish the shared OSCORE master secret. To provide forward secrecy, EDHOC uses a Diffie-Hellman (DH) key exchange protocol with ephemeral keys from which the shared master secret is derived. The standard EDHOC protocol is adapted to use the eUICC identity and PKI of remote profile download to authenticate the DH key-exchange messages.

EDHOC involves three messages exchanged between the two communicating parties. When used on top of CoAP, a CoAP client may access EDHOC at the CoAP server using the registered URI "edhoc". In the present disclosure the communication device 200 is the CoAP client, also referred to as party "U", and the ID backend server 300 is the CoAP server, also referred to as the party "V". The CoAP client makes a POST to the above mentioned URI with EDHOC message 1 as payload (step 403). The response contains EDHOC message 2 in the payload (step S405) and the CoAP client can then make a second POST to the same URI with EDHOC message 3 as the payload (step S413).

S401: The device ID handling client in the communication device 200 triggers an EDHOC session using the eUICC identity.

S402 (S402a, S402b, S402c, S402d, S402e, S402f): The EDHOC stack requests (step S402a) an eUICC challenge and eUICC info1 from the LPAd assisting in SIM profile download and management. The LPAd interacts with the eUICC to obtain the eUICC challenge and eUICC info1 that are returned to the EDHOC stack. The eUICC challenge is a 16-byte random number and eUICC info 1 provides information about supported CAs for signing and verification at the eUICC.

S403: The EDHOC stack prepares EDHOC message 1. This message contains a list of ciphersuites in which the preferred ciphersuite indicates the use of GSMA RSP formatted signatures. The message also comprises an ephemeral public key (x-coordinate only) from an ephemeral elliptic curve (EC) key pair generated by the communication device 200, a connection identifier, and unprotected application data (UAD1). Compared to standard EDHOC, the UAD1 is present and contains the eUICC challenge concatenated with eUICC info1. Alternatively, the eUICC info 1 is already known at the ID backend server 300 (e.g. configured as part of step S5) in which case it may be left out from UAD1. The EDHOC message 1 is forwarded to the ID backend server 300.

S404: The ID backend server 300 extracts necessary data from EDHOC message 1, and prepares the response message, i.e. EDHOC message 2. The ID backend server 300 checks that preferred ciphersuite indicates the use of GSMA formatted signatures, otherwise an error is returned. The EDHOC message 2 includes an ephemeral public key (x-coordinate only) from an ephemeral EC key pair generated by the ID backend server 300, ID backend server 300 connection identifier, communication device 200 connection identifier (optional), and encrypted data (ED_2). ED_2 is the encryption of the ID backend server 300 certificate, unprotected application data (UAD2), and a signature, using an AEAD algorithm and a key K_2 derived from the ECDH shared secret, in turn derived from the ephemeral key pairs. The signature is according to the standard EDHOC protocol computed using COSE_Sign1 where the COSE_Sign1 ToBeSigned formatted data comprises an identifier to facilitate retrieval of the public key/certificate of the ID backend server 300, the certificate of the ID backend server 300, and the transcript hash TH_2, and where the transcript hash TH_2 is the hash of the concatenation of EDHOC message 1, the communication device connection identifier (optional, only if present in EDHOC message 2), the ephemeral public key (x-coordinate only) from the ID backend server 300 ephemeral elliptic curve (EC) key pair, and the ID backend server connection identifier. The hash algorithm to be used is given by the EDHOC preferred ciphersuite. The COSE_Sign1 ToBeSigned data is here hashed using SHA-256 to produce a 32-byte hash. The signature is then computed according to GSMA RSP on the serverSigned1 structure where the fields of serverSigned1 are as follows: The serverChallenge of serverSigned1 is chosen as the 16 first bytes of the 32-byte hash and the transactionID of serverSigned1 is chosen as the remaining 16 bytes of the 32-byte hash. The eUICCChallenge of serverSigned1 is obtained from EDHOC message 1 and the serverAddress of serverSigned1 is chosen as the URL of the ID backend server 300. UAD2 may include a value indicating which root CA, in case there are many supported in the eUICC, to which the eUICC certificate should chain.

S405: The EDHOC message 2 is sent to the communication device 200.

S406: The EDHOC stack verifies the EDHOC message 2 and generates EDHOC message 3. The EDHOC message 3 comprises encrypted data (ED_3) and the ID backend server connection identifier (optional). ED_3 is the encryption of the device certificate, protected application data (PAD3), and a signature, using an authenticated encryption with associated data (AEAD) algorithm and a key K_3 derived from the ECDH shared secret, in turn derived from the ephemeral key pairs. The signature is in the standard EDHOC protocol computed using COSE_Sign1 where the COSE_Sign1 ToBeSigned formatted data comprises an identifier to facilitate retrieval of the public key/certificate of the communication device 200, the certificate of the communication device 200, and the transcript hash TH_3, and where the transcript hash TH_3 is the hash of the concatenation of TH_2, ED_2, and the ID backend server connection identifier (optional, only if present in EDHOC message 3). The hash algorithm to be used is given by the EDHOC preferred ciphersuite. As part of verifying EDHOC message 2 signature and ID backend server 300 certificate and generating EDHOC message 3 signature the EDHOC stack calls the LPAd. The following data is provided: eUICCChallenge, SHA-256 hash of COSE_Sign1 ToBeSigned formatted data according to description in step S404, ID backend server 300 URL, the ID backend server 300 certificate, signature, SHA-256 hash of COSE_Sign1 ToBeSigned formatted data as to be signed by the communication device 200 (see description above in step S406), indication of root CA (subjectKeyIdentifier) to which the eUICC certificate should chain.

S407: The LPAd constructs the GSMA RSP formatted AuthenticateServerRequest structure from the received data. The AuthenticateServerRequest comprises serverSigned1, ID backend signature (i.e. serverSignature1), euiccCiPKIdToBeUsed, the ID backend certificate (i.e. serverCertificate), and ctxParams1. The serverSigned1 structure is constructed according to description in step S404. A new ctxParams1 structure is used where the SHA-256 hash of COSE_Sign1 ToBeSigned formatted data as to be signed by the device (see description in step S406) is included. If no subjectKeyIdentifier was provided by the ID backend server 300, the LPAd selects the first value in the list provided in eUICC info 1 (obtained from eUICC in step S402) and include as euiccCiPKIdToBeUsed in AuthenticateServerRequest.

S408: The LPAd invokes the GSMA RSP AuthenticateServer command at the eUICC with the AuthenticateServerRequest structure.

S409: The eUICC verifies the AuthenticateServerRequest to authenticate the ID backend server 300. If successful verification, the eUICC creates the GSMA RSP formatted AuthenticateServerResponse structure containing the eUICC certificate, EUM certificate, euiccSigned1 structure, and the eUICC signature calculated using the eUICC private key on the euiccSigned1 formatted data. The euiccSigned1 data comprises ctxParams1, eUICC info2, transactionId, serverChallenge, and serverAddress.

S410: The AuthenticateServerResponse structure is returned to the LPAd.

S411: The LPAd extracts the eUICC signature, eUICC info2, eUICC certificate, and the EUM certificate.

S412: The extracted data is provided to the EDHOC stack that finishes the generation of EDHOC message 3. The device credential is here the concatenation of the eUICC certificate followed by the EUM certificate, and the signature is the eUICC signature concatenated with the eUICC info2 structure. Alternatively, the EUM certificate and/or the eUICC info2 may also be placed as part PAD3.

S413: The EDHOC message 3 is sent to the ID backend server 300.

S414: In parallel the LPAd sends a cancelSession message to reset the eUICC such that it is ready for new sessions (EDHOC, or profile download).

S415: The ID backend server 300 reconstructs the parts of the AuthenticateServerResponse structure needed for verification from the received data (i.e. eUICC certificate, EUM certificate, eUICC signature, and eUICC info2), cashed data (serverChallenge and transactionId), and computed SHA-256 hash of COSE_Sign1 ToBeSigned formatted data based on the same data as signed by the communication device 200 (see description in step S406). The ID backend server 300 verifies the data including the eUICC signature, eUICC certificate, and EUM certificate.

S416: Upon successful verification, the communication device 200 and the ID backend server 300 use the EDHOC-Exporter interface to generate the shared OSCORE master secret and then compute the OSCORE security context from the master secret and sender ID and receiver ID. For example, the sender ID at the communication device 200 is derived from the EID and the receiver ID is hardcoded in the communication device 200 at manufacturing. The hardcoded value is also used as sender ID at the ID backend server 300, and the receiver ID is there the EID from the communication device 200. The ID backend server 300 extracts the EID from the eUICC certificate.

S417: Communication between the communication device 200 and the ID backend server 300 is protected using OSCORE.

The eUICC might not allow to read out eUICC certificate and EUM certificate without performing a signature operation. For this reason, the eUICC certificate and EUM certificate should be left out from COSE_Sign1 ToBeSigned formatted data that is signed by the communication device 200. Hence, instead of including the certificate of the communication device a null string is used. In an alternative, these certificates are configured to the LPAd/EDHOC stack at device/module manufacturing such that eUICC certificate concatenated with EUM certificate can be included as the certificate of the communication device 200 in the COSE_Sign1 ToBeSigned formatted data.

If a hash algorithm is used producing more than 32 bytes, then truncation is used and the 32 first bytes are used as Transcription-Hash.

Figure 7:
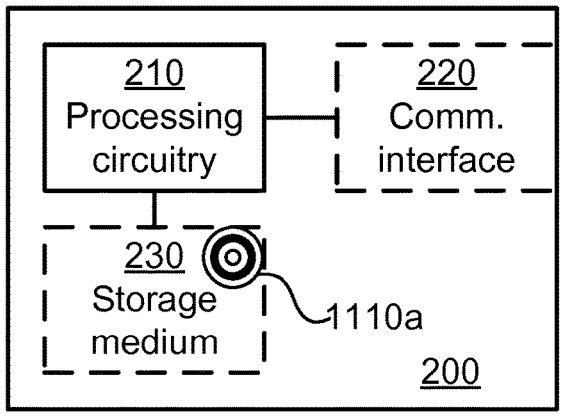
FIG. 7 is a schematic diagram showing functional units of a communication device according to an embodiment.

FIG. 7 schematically illustrates, in terms of a number of functional units, the components of a communication device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110a (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the communication device 200 to perform a set of operations, or steps, as disclosed above. For example, the storage medium 230 may store the set of operations, and the processing circuitry 210 may be configured to retrieve the set of operations from the storage medium 230 to cause the communication device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The communication device 200 may further comprise a communications interface 220 for communications with other devices, functions, nodes, entities, servers, etc. of the communication system 100. As such the communications interface 220 may comprise one or more transmitters and receivers, comprising analogue and digital components.

The processing circuitry 210 controls the general operation of the communication device 200 e.g. by sending data and control signals to the communications interface 220 and the storage medium 230, by receiving data and reports from the communications interface 220, and by retrieving data and instructions from the storage medium 230. Other components, as well as the related functionality, of the communication device 200 are omitted in order not to obscure the concepts presented herein.

Figure 8:
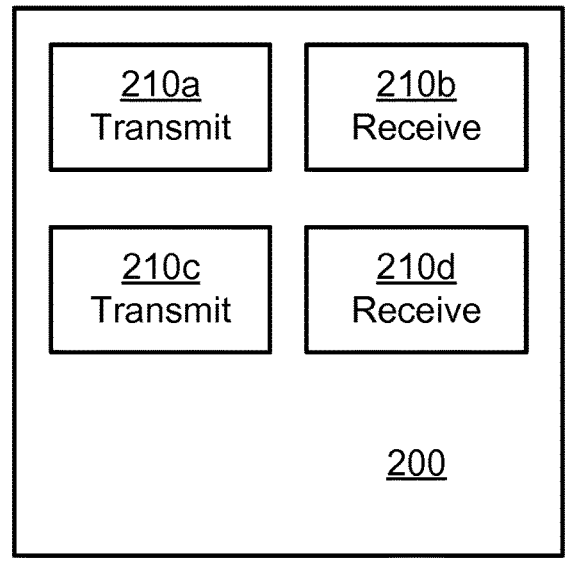
FIG. 8 is a schematic diagram showing functional modules of a communication device according to an embodiment.

FIG. 8 schematically illustrates, in terms of a number of functional modules, the components of a communication device 200 according to an embodiment. The communication device 200 of FIG. 8 comprises a number of functional modules; a transmit module 210a configured to perform step S102, a receive module 210b module configured to perform step S104, a transmit module 210c configured to perform step S106, and a receive module 210d configured to perform step S108. The communication device 200 of FIG. 8 may further comprise a number of optional functional modules. In general terms, each functional module 210a-210d may be implemented in hardware or in software. Preferably, one or more or all functional modules 210a-210d may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210d and to execute these instructions, thereby performing any steps of the communication device 200 as disclosed herein.

Examples of communication devices 200 have been mentioned above.

Figure 9:
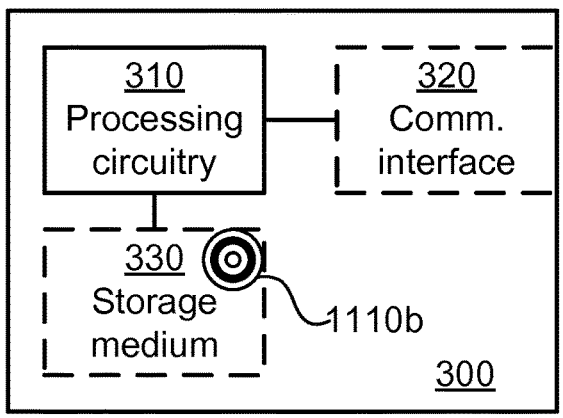
FIG. 9 is a schematic diagram showing functional units of an ID backend server according to an embodiment.

FIG. 9 schematically illustrates, in terms of a number of functional units, the components of an ID backend server 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1110b (as in FIG. 11), e.g. in the form of a storage medium 330. The processing circuitry 310 may further be provided as at least one application specific integrated circuit (ASIC), or field programmable gate array (FPGA).

Particularly, the processing circuitry 310 is configured to cause the ID backend server 300 to perform a set of operations, or steps, as disclosed above. For example, the storage medium 330 may store the set of operations, and the processing circuitry 310 may be configured to retrieve the set of operations from the storage medium 330 to cause the ID backend server 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The ID backend server 300 may further comprise a communications interface 320 for communications with other devices, functions, nodes, entities, servers, etc. of the communication system 100. As such the communications interface 320 may comprise one or more transmitters and receivers, comprising analogue and digital components.

The processing circuitry 310 controls the general operation of the ID backend server 300 e.g. by sending data and control signals to the communications interface 320 and the storage medium 330, by receiving data and reports from the communications interface 320, and by retrieving data and instructions from the storage medium 330. Other components, as well as the related functionality, of the ID backend server 300 are omitted in order not to obscure the concepts presented herein.

Figure 10:
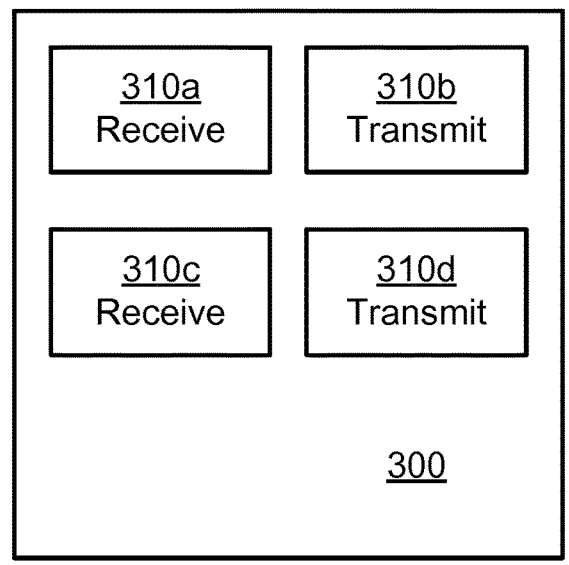
FIG. 10 is a schematic diagram showing functional modules of an ID backend server according to an embodiment.

FIG. 10 schematically illustrates, in terms of a number of functional modules, the components of an ID backend server 300 according to an embodiment. The ID backend server 300 of FIG. 10 comprises a number of functional modules; a receive module 310a configured to perform step S202, a transmit module 310b configured to perform step S204, a receive module 310c configured to perform step S206, and a transmit module 310d configured to perform step S208. The ID backend server 300 of FIG. 10 may further comprise a number of optional functional modules. In general terms, each functional module 310a-310d may be implemented in hardware or in software. Preferably, one or more or all functional modules 310a-310d may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310d and to execute these instructions, thereby performing any steps of the ID backend server 300 as disclosed herein.

The ID backend server 300 may be provided as a stand-alone device or as a part of at least one further device. For example, the ID backend server 300 may be provided in a node of an Internet Protocol based data service network. Alternatively, functionality of the ID backend server 300 may be distributed between at least two devices, or nodes. These at least two nodes, or devices, may either be part of the same network part or may be spread between at least two such network parts. Thus, a first portion of the instructions performed by the ID backend server 300 may be executed in a first device, and a second portion of the instructions performed by the ID backend server 300 may be executed in a second device; the herein disclosed embodiments are not limited to any particular number of devices on which the instructions performed by the ID backend server 300 may be executed. Hence, the methods according to the herein disclosed embodiments are suitable to be performed by an ID backend server 300 residing in a cloud computational environment. Therefore, although a single processing circuitry 310 is illustrated in FIG. 9 the processing circuitry 310 may be distributed among a plurality of devices, or nodes. The same applies to the functional modules 310a-310d of FIG. 10 and the computer program 1120b of FIG. 11.

Figure 11:
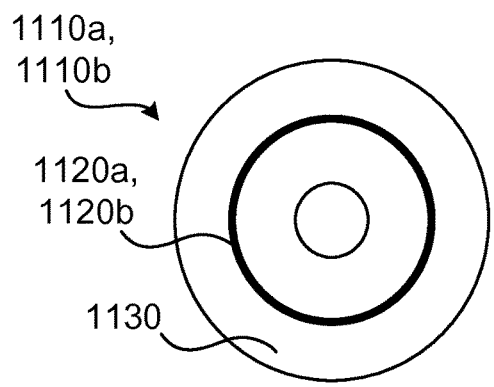
FIG. 11 shows one example of a computer program product comprising computer readable means according to an embodiment.

FIG. 11 shows one example of a computer program product 1110a, 1110b comprising computer readable means 1130. On this computer readable means 1130, a computer program 1120a can be stored, which computer program 1120a can cause the processing circuitry 210 and thereto operatively coupled entities and devices, such as the communications interface 220 and the storage medium 230, to execute methods according to embodiments described herein. The computer program 1120a and/or computer program product 1110a may thus provide means for performing any steps of the communication device 200 as herein disclosed.

On this computer readable means 1130, a computer program 1120b can be stored, which computer program 1120b can cause the processing circuitry 310 and thereto operatively coupled entities and devices, such as the communications interface 320 and the storage medium 330, to execute methods according to embodiments described herein. The computer program 1120b and/or computer program product 1110b may thus provide means for performing any steps of the ID backend server 300 as herein disclosed.

In the example of FIG. 11, the computer program product 1110a, 1110b is illustrated as an optical disc, such as a CD (compact disc) or a DVD (digital versatile disc) or a Blu-Ray disc. The computer program product 1110a, 1110b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120a, 1120b is here schematically shown as a track on the depicted optical disk, the computer program 1120a, 1120b can be stored in any way which is suitable for the computer program product 1110a, 1110b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

LIST OF ABBREVIATIONS

3GPP Third Generation Partnership Project
API Application Programming Interface
BS Bootstrap Server
CA Certificate Authority
CBOR Concise Binary Object Representation
CI Certificate Issuer
CoAP Constrained Application Protocol
COSE CBOR Object Signing and Encryption
DH Diffie-Hellman
DDM Device and Data Management
DTLS Datagram Transport Layer Security
EDHOC Ephemeral Diffie-Hellman Over COSE
EID eUICC Identifier
EPID Enhanced Privacy ID
eUICC Embedded UICC
EUM eUICC Manufacturer
GSMA Global System for Mobil Communications Association
ID Identity/Identifier
IMEI International Mobile station Equipment Identifier
IoT Internet of Things
iUICC Integrated UICC
LPA Local Profile Assistant LPAd Local Profile Assistant device
LwM2M Light-weight Machine to Machine
MNO Mobile Network Operator
MS Management Server
OSCORE Object Security for Constrained RESTful Environments
PKI Public Key Infrastructure
PSK Pre-Shared Key
RPK Raw Public Key
RSP Remote SIM Provisioning
SIM Subscriber Identity Module
SoC System-on-Chip
TEE Trusted Execution Environment
TLS Transport Layer Security
UICC Universal Integrated Circuit Card
URL Uniform Resource Locator

The invention claimed is:

1. A method for provisioning of an application level identity from an ID backend server to a communication device; wherein the provisioning of the application level identity is protected using Transport Layer Security (TLS)-, Datagram Transport Layer Security (DTLS)-, or Object Security for Constrained RESTful Environments (OSCORE)-based secure communication; wherein the communication device comprises an identity module configured for interaction according to Global System for Mobile Communications Association Remote Subscriber Identity Module (SIM) Provisioning (GSMA RSP) based remote subscription profile download; the method comprising the communication device:
transmitting a first message to the ID backend server to establish secure communication with the ID backend server, wherein the first message is a ClientHello message of a TLS handshake protocol and comprises an identity module challenge;
receiving a second message from the ID backend server as a part of establishing the secure communication with the ID backend server, wherein the second message is provided as a combination of a ServerHello message, a CertificateRequest message indicating a request for an identity module certificate, a Certificate message comprising an ID backend certificate, a Certificate Verify message comprising an ID backend signature for authentication of the ID backend server at the communication device, and a Finished message of the TLS handshake protocol;
transmitting a third message to the ID backend server as a part of establishing the secure communication with the ID backend server, wherein the third message comprises an identity module signature for authentication of the communication device at the ID backend server, wherein a secure connection is established between the communication device and the ID backend server based on the third message; and
receiving a fourth message from the ID backend server, wherein the fourth message comprises an application level identity information and is protected using the established secure communication with the ID backend server.

2. The method of claim 1, wherein the ID backend signature is based on the identity module challenge and additional exchanged protocol data.

3. The method of claim 2:
wherein the additional exchanged protocol data comprises all exchanged TLS or DTLS Handshake Protocol messages up to and including the Certificate message sent from the ID backend server to the communication device; and
wherein the ID backend signature is based on the identity module challenge and hash of all exchanged TLS or DTLS Handshake Protocol messages up to and including the Certificate message.

4. The method of claim 1, wherein the ID backend signature is based on data that follows a format used for handling remote subscription profile download to the identity module.

5. The method of claim 1, wherein the identity module signature is based on the identity module credentials used for remote subscription profile download.

6. The method of claim 1, wherein the identity module signature is based on data that follows a format used for remote subscription profile download to the identity module, and wherein the identity module signature is based on exchanged protocol data.

7. The method of claim 6:
wherein the exchanged protocol data comprises all exchanged TLS or DTLS Handshake Protocol messages up to and including the Certificate Verify message sent from the ID backend server to the communication device; and
wherein the identity module signature is based on the hash of all exchanged TLS or DTLS Handshake Protocol messages up to and including the Certificate Verify message.

8. The method of claim 1, wherein the identity module is a universal integrated-circuit card (UICC), an embedded universal integrated-circuit card (eUICC), or an integrated universal integrated-circuit card (iUICC).

9. The method of claim 1, wherein the identity module challenge is generated by the identity module.

10. The method of claim 1:
wherein the ID backend signature and the ID backend certificate are verified by the identity module of the communication device;
wherein the identity module signature is created by the identity module of the communication device before the communication device transmits the third message; and
wherein the identity module signature is created by the identity module only upon successful verification of the ID backend signature and the ID backend certificate.

11. The method of claim 10, wherein the identity module certificate is obtained from the identity module only upon successful verification of the ID backend certificate and the ID backend signature and successful creation of the identity module signature.

12. A method for provisioning of an application level identity from an ID backend server to a communication device; wherein the provisioning of the application level identity is protected using Transport Layer Security (TLS)-, Datagram Transport Layer Security (DTLS)-, or Object Security for Constrained RESTful Environments (OSCORE)-based secure communication; wherein the communication device comprises an identity module configured for interaction according to Global System for Mobile Communications Association Remote Subscriber Identity Module (SIM) Provisioning (GSMA RSP) based remote subscription profile download, the method comprising the ID backend server:
receiving a first message from the communication device to establish secure communication with the communication device, wherein the first message is a ClientHello message of a TLS handshake protocol and comprises an identity module challenge;

transmitting a second message to the communication device as a part of establishing the secure communication with the communication device, wherein the second message is provided as a combination of a ServerHello message, a CertificateRequest message indicating a request for a first identity module certificate, a Certificate message comprising an ID backend certificate, a Certificate Verify message comprising an ID backend signature for authentication of the ID backend server at the communication device, and a Finished message of the TLS handshake protocol;

receiving a third message from the communication device as a part of establishing the secure communication with the communication device, wherein the third message comprises a first identity module signature for authentication of the communication device at the ID backend server;

establishing a secure connection between the communication device and the ID backend server based on the received third message; and transmitting a fourth message to the communication device, wherein the fourth message comprises an application level identity information and is protected using the established secure communication with the communication device.

13. The method of claim 12, wherein the ID backend signature is based on the identity module challenge and additional exchanged protocol data.

14. The method of claim 12, wherein the ID backend signature is based on data that follows a format used for handling remote subscription profile download to the identity module.

15. The method of claim 12, wherein the first identity module signature is based on the identity module credentials used for remote subscription profile download.

16. The method of claim 12, wherein the first identity module signature is based on data that follows a format used for remote subscription profile download to the identity module, and wherein the first identity module signature is based on exchanged protocol data.

17. The method of claim 12:
wherein the third message comprises a second identity module certificate and a second identity module signature; and
wherein the second identity module certificate and the second identity module signature are verified by the ID backend server before transmitting the fourth message.

18. A communication device for provisioning of an application level identity from an ID backend server to the communication device, wherein the provisioning of the application level identity is protected using Transport Layer Security (TLS)-, Datagram Transport Layer Security (DTLS)-, or Object Security for Constrained RESTful Environments (OSCORE)-based secure communication; wherein the communication device comprises an identity module configured for interaction according to Global System for Mobile Communications Association Remote Subscriber Identity Module (SIM) Provisioning (GSMA RSP) based remote subscription profile download; the communication device comprising:
processing circuitry;
memory containing instructions executable by the processing circuitry whereby the communication device is operative to:
transmit a first message to the ID backend server to establish secure communication with the ID backend server, wherein the first message is a ClientHello message of a TLS handshake protocol and comprises an identity module challenge;
receive a second message from the ID backend server as a part of establishing the secure communication with the ID backend server, wherein the second message is provided as a combination of a ServerHello message, a CertificateRequest message indicating a request for an identity module certificate, a Certificate message comprising an ID backend certificate, a Certificate Verify message comprising an ID backend signature for authentication of the ID backend server at the communication device, and a Finished message of the TLS handshake protocol;
transmit a third message to the ID backend server as a part of establishing the secure communication with the ID backend server, wherein the third message comprises an identity module signature for authentication of the communication device at the ID backend server, wherein a secure connection is established between the communication device and the ID backend server based on the third message; and
receive a fourth message from the ID backend server, wherein the fourth message comprises an application level identity information and is protected using the established secure communication with the ID backend server.

19. An ID backend server for provisioning of an application level identity from the ID backend server to a communication device, wherein the provisioning of the application level identity is protected using Transport Layer Security (TLS)-, Datagram Transport Layer Security (DTLS)-, or Object Security for Constrained RESTful Environments (OSCORE)-based secure communication; wherein the communication device comprises an identity module configured for interaction according to Global System for Mobile Communications Association Remote Subscriber Identity Module (SIM) Provisioning (GSMA RSP) based remote subscription profile download; the ID backend server comprising:
processing circuitry;
memory containing instructions executable by the processing circuitry whereby the ID backend server is operative to:
receive a first message from the communication device to establish secure communication with the communication device, wherein the first message is a ClientHello message of a TLS handshake protocol and comprises an identity module challenge;
transmit a second message to the communication device as a part of establishing the secure communication with the communication device, wherein the second message is provided as a combination of a ServerHello message, a CertificateRequest message indicating a request for an identity module certificate, a Certificate message comprising an ID backend certificate, a Certificate Verify message comprising an ID backend signature for authentication of the ID backend server at the communication device, and a Finished message of the TLS handshake protocol;
receive a third message from the communication device as a part of establishing the secure communication with the communication device, wherein the third message comprises an identity module signature for authentication of the communication device at the ID backend server;

establish a secure connection between the communication device and the ID backend server based on the received third message; and transmit a fourth message to the communication device, wherein the fourth message comprises an application level identity information and is protected using the established secure communication with the communication device.

\* \* \* \* \*